United States Patent [19]
Reedy

[11] Patent Number: 5,619,864
[45] Date of Patent: Apr. 15, 1997

[54] COMPACT HEAT PUMP

[75] Inventor: Wayne R. Reedy, Edwardsville, Ill.

[73] Assignee: Nordyne, Inc., St. Louis, Mo.

[21] Appl. No.: 569,833

[22] Filed: Dec. 7, 1995

Related U.S. Application Data

[63] Continuation of Ser. No. 292,731, Aug. 18, 1994, abandoned.

[51] Int. Cl.$^6$ ..................................................... F25D 17/06
[52] U.S. Cl. ............................. 62/428; 62/259.1; 62/263; 165/53; 165/DIG. 317
[58] Field of Search .................................. 62/324.1, 263, 62/259.1, 404, 428; 165/53, 54, 55, 56, 121, DIG. 317

[56] References Cited

U.S. PATENT DOCUMENTS

| | | | |
|---|---|---|---|
| 3,097,506 | 7/1963 | Blakesley, Sr. | 62/263 |
| 3,831,395 | 8/1974 | Levy | 165/53 |

Primary Examiner—John M. Sollecito

[57] ABSTRACT

A heat pump unit for use in small buildings where the unit must be stored in a confined space, not having access to the exterior walls of the building. The unit is contained within a rectangular housing that is divided into three compartments. An outdoor air compartment is vertically disposed between the top and bottom walls at the rear of the housing and an indoor air compartment and a compressor compartment are mounted one over the other at the front of the housing. An outdoor air blower is mounted outside of the housing to save space and is arranged to move air through the outdoor air compartment along a vertical path of travel. An interior vertical wall separates the rear compartment from the two front compartments and contains an upper vertical section and rear wall offset lower vertical section joined by an angularly disposed intermediate section along a vertical path of travel. An outdoor coil is mounted in the rear compartment at an angle adjacent to the intermediate wall section so that the coil extends into both the upper and lower parts of the rear compartment.

15 Claims, 3 Drawing Sheets

5,619,864

COMPACT HEAT PUMP

This is a continuation of U.S. patent application Ser. No. 08/292,731 filed Aug. 18, 1994, now abandoned.

BACKGROUND OF THE INVENTION

This invention relates to a heat pump unit that can be stored within a confined enclosure that does not have access to the exterior walls of the building and, in particular, to a heat pump unit that is suitable for use in a small building such as a mobile home or the like, where usable space is at a premium.

Bingham, in U.S. Pat. No. 4,598,558 describes a heat pump that can be mounted within a small building that does not require access to the exterior walls of the building. The heat pump in contained within a housing having upper and lower compartments. The upper compartment for handling outdoor air that contains an outdoor heat exchanger (herein referenced to as a coil), a blower, and a compressor. The lower compartment contains a second coil and blower and is adapted to handle comfort or indoor air that is being conditioned. The outdoor air is drawn from the attic of the building and is exhausted through the floor of the building into the cellar. Comfort air is drawn through a side wall of a room and is exhausted into a distribution duct located beneath the floor of the building.

Although the Bingham unit is configured to save space when compared to other free-standing heat pumps, the air path through the housing on the outdoor air side of the unit is tortuous and thus adversely affects the overall performance of the unit. In addition, the compressor, which is mounted in the upper compartment, generates a good deal of heat which can adversely effect performance when the unit is operating in a cooling mode.

Addington, in U.S. Pat. No. 5,271,242 discloses a unit that is very similar to the Bingham unit wherein the outdoor air components are stored in a lower compartment and the indoor air components are stored in an upper compartment. Here, outdoor air enters and leaves the unit through the bottom wall of the unit. In one embodiment, a single duct brings both outdoor air to and from the unit. In a second embodiment, two individual ducts situated beneath the floor of the building are required to service the lower compartment. Like Bingham, Addingham utilizes a good deal of space and because of its configuration forces the air moving through the unit to follow circuitous routes.

A primary concern relating to free-standing heat pumps that must be stored in a confined enclosure such as a closet, is the capability of gaining access to the various component for the purpose of servicing or maintaining the unit. Typically, the unit is enclosed within an integral housing which necessitates pulling the entire unit from the closet in order to gain access to all parts of the unit. This can be a time-consuming, difficult and costly task.

SUMMARY OF THE INVENTION

A primary object of this invention is to provide a compact heat pump unit that can be easily mounted in a confined enclosure.

It is a further object of the present invention to provide a compact heat pump unit that does not require access to the outside walls of a building.

A still further object of the present invention is to provide a compact heat pump that has a vertical unobstructed outdoor air path that permits a high volume of outdoor air to be efficiently passed through the unit.

Another object of the present invention is to provide a compact heat pump unit for use in a confined enclosure having a compressor that is isolated from the both indoor and outdoor air compartments.

Yet another object of the present invention is to provide a compact heat pump unit for mounting within a confining enclosure, the unit being contained within a separable housing providing easy access to the internal components of the unit without having to remove the unit from the enclosure.

Still another object of the present invention is to provide a compact heat pump unit having a vertical disposed outdoor air compartment and a blower mounted in a duct connected to the outdoor air compartment of the unit.

These and further objects of the invention are attained by a heat pump for use in a confined enclosure that is not accessible to the exterior walls of a building. The heat pump includes a rectangular housing having top and bottom walls and vertical side walls. The housing is divided into a vertically disposed rear outdoor air compartment extending between the top and bottom walls having a vertical flow path therethrough for conducting outside air through the unit. An indoor air compartment and a compressor compartment are located one above the other in the front part of the housing. An interior wall which separates the front and rear compartments has an angularly disposed mid-section that extends the upper part of the outdoor air compartment into the indoor air compartment. The outdoor air coil is angularly positioned adjacent the angularly disposed mid-wall section. The outdoor air blower is mounted exterior the housing in a duct and is arranged to move air through the unit along a generally uninterrupted flow path.

The unit housing includes a front casing containing the indoor air compartment and the compressor compartment. The front casing is separable from a rear casing containing the outdoor air compartment. The two casings are connected by removable fasteners so that the casings can be separated when the housing is located in a confined enclosure thereby allowing access to the equipment located in the housing for maintenance and service.

BRIEF DESCRIPTION OF THE DRAWINGS

For a better understanding of these and other objects of the present invention, reference will be made to the following detailed description of the invention which is to be read in association with the accompanying drawings; wherein.

DESCRIPTION OF THE INVENTION

Figure 1:
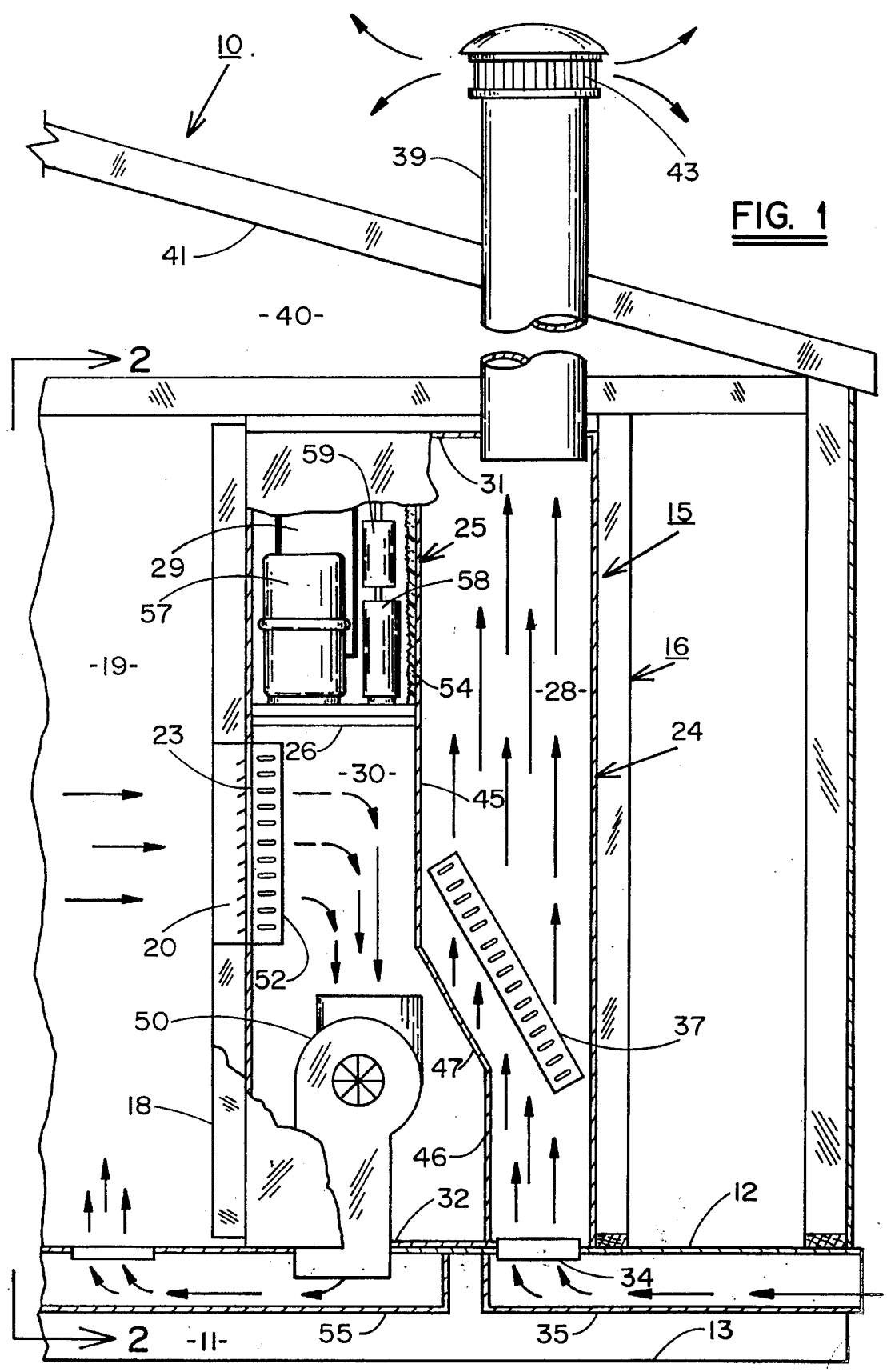
FIG. 1 is a side elevation with portions broken away showing a heat pump unit embodying the teachings of the present invention mounted within a small building.
Figure 2:
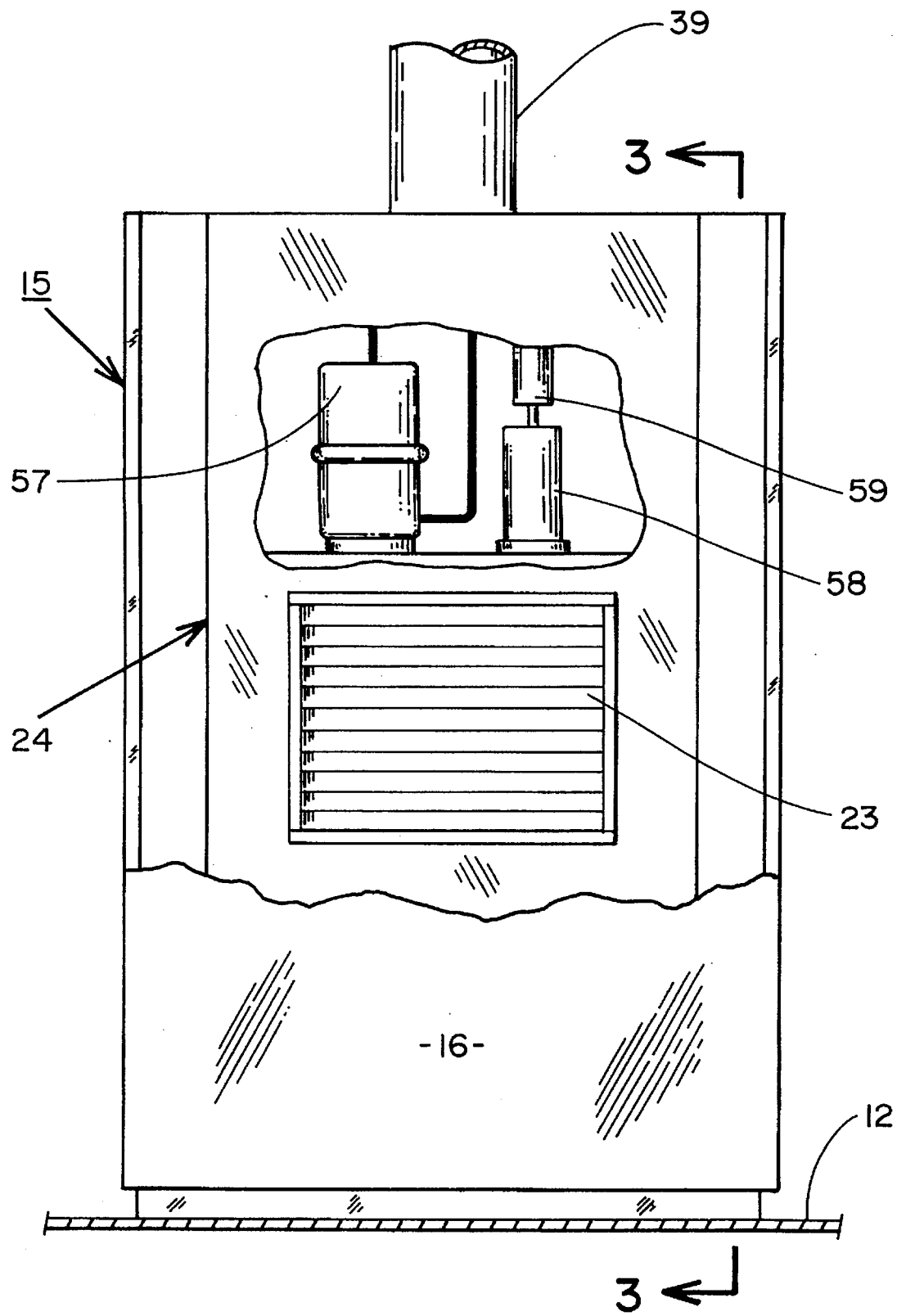
FIG. 2 is a front view of the heat exchanger illustrated in FIG. 1.

Referring initially to FIGS. 1 and 2, there is illustrated a small one story building, generally referenced 10 such as a prefabricated or mobile home. As is well known, this type of structure is usually supported on a shallow subbasement that provides only a confined crawl space 11 between the floor 12 of the building and the floor 13 of the subbasement. In addition, very little storage space is provided within the building and mounting a heating and/or cooling unit such as a heat pump in the building is oftentimes difficult. Because of space constraints and other design considerations, the equipment storage area is oftentimes centrally located within the building away from any exterior wall. This poses a problem when a heat pump is utilized because there is no ready access to outside air. As will be explained in greater detail below, the heat pump unit of the present invention is ideally well suited for use in this type of structure for providing efficient heating and cooling as well as providing for ease of service.

A heat pump unit 15 is contained within the building 10 within a confined storage closet 16 that encloses the housing of the unit. The closet has a front access door 18 that opens to a room 19. The door is furnished with a louver type grill 20 through which inside air can pass freely into the housing via the indoor air entrance 23.

The unit housing 24 is fabricated of sheet metal and is generally rectangular in form so that it can slide easily into the storage closet through the front entrance. The housing is divided by an interior vertical wall 25 and horizontal wall 26 into three separate compartments. These include a rear outdoor air compartment 28, an upper front compressor compartment 29 and a lower front indoor air compartment 30. The outdoor air compartment is vertically disposed between the top wall 31 and the bottom wall 32 of the housing. The compartment contains a bottom opening 34 that communicates with an inlet duct 35. The inlet duct is mounted beneath the floor of the building within the crawl space and extends horizontally beneath the building to conduct outdoor air to the rear compartment as indicated by the arrows. A heat exchanger coil 37 is angularly positioned within the outdoor air compartment. The outside air is exhausted to the atmosphere by means of a metal chimney 39. The chimney passes upwardly through the attic 40 and the roof 41 of the building. In order to conserve space, the outdoor air blower 43 is mounted in the upper part of the chimney as illustrated in FIG. 1. The chimney and the outdoor air compartment coact to establish an unobstructed vertical flow path for the outdoor air conducted through the unit.

The interior vertical wall 25 of the unit housing includes an upper vertical section 45 and an offset lower vertical section 46 that are connected by an intermediate section 47. The intermediate section is disposed at the same angle as the outdoor air coil 37 and serves to expand the upper section of the outdoor air compartment over the indoor air blower 50, mounted in the bottom of the adjacent indoor air compartment.

An indoor air coil 52 is vertically mounted in the indoor air compartment immediately behind the opening 23 provided in the front wall of the housing. As noted above, blower 50 is mounted in the lower part of the indoor air compartment, and is arranged to discharge into a distribution duct 55 below the building mounted in the crawl space 11. The conditioned air leaving the indoor air compartment is circulated throughout the building to provide either heating or cooling before being recirculated to the heat pump unit.

Located immediately above the indoor air compartment is the compressor compartment 29 which contains a compressor 57, an accumulator 58, and a four-way flow reversing valve 59. Although not shown, the coils are interconnected by suitable expansion devices and are further connected through the flow reversing valve to the compressor to selectively provide either a heating or a cooling cycle, to satisfy the demands placed on the system. The compressor compartment may also house suitable control means for monitoring and regulating the operation of the heat pump unit. The compressor compartment is insulated thermally and acoustically by an insulating blanket 54 which controls the amount of heat and noise escaping from the compartment.

Figure 3:
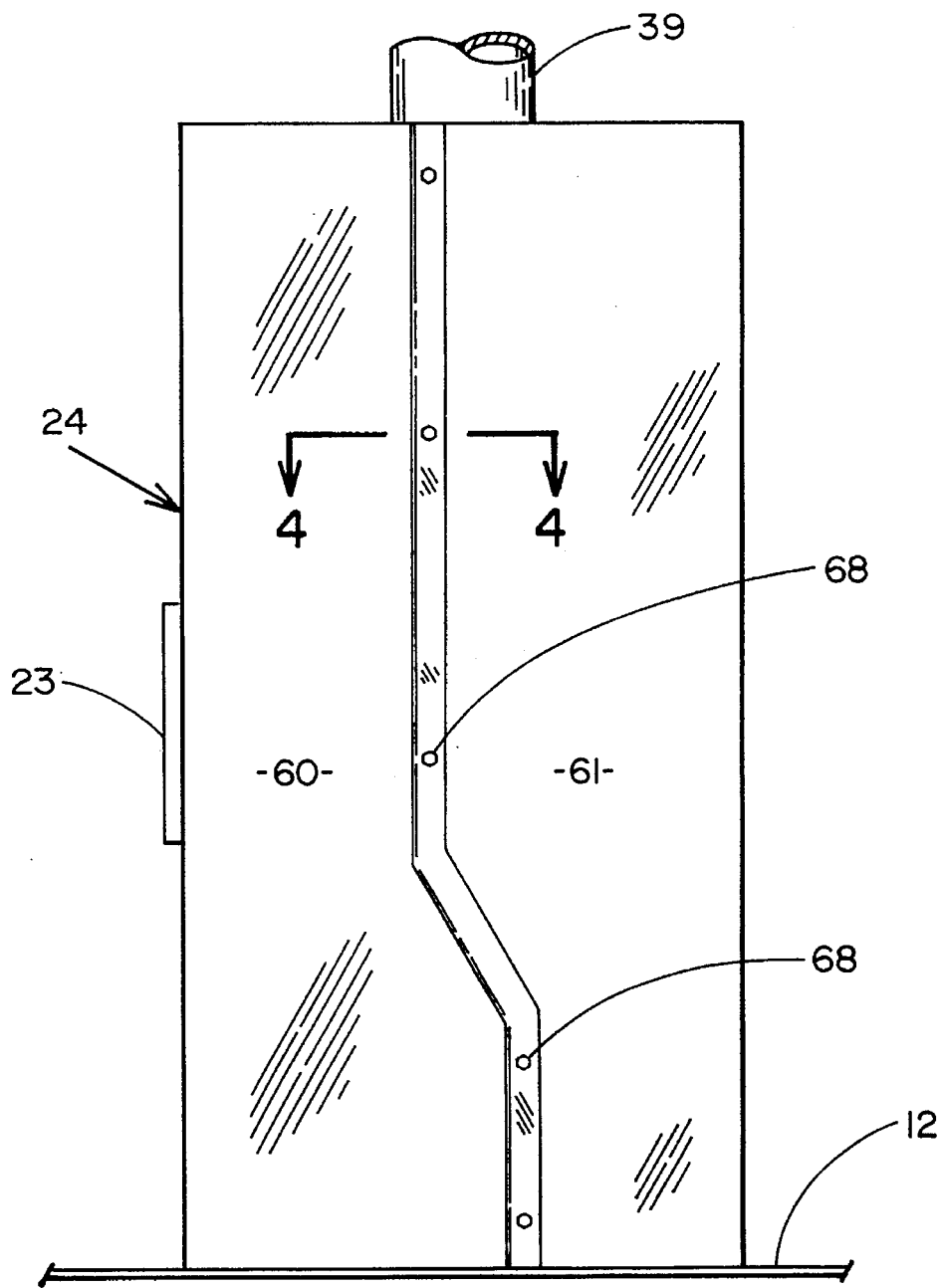
FIG. 3 is a side elevation showing the front and rear casings of the unit housing joined together in assembly.
Figure 4:
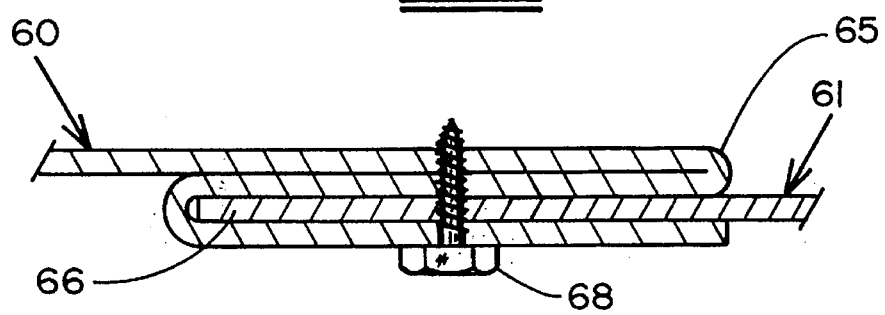
FIG. 4 is an enlarged partial section taken along lines 4—4 in FIG. 3.

Turning now to FIGS. 3 and 4, the housing of the unit is divided into two separate casings 60 and 61. The front casing 60 contains the compressor and indoor air compartments and the rear casing 61 contains the outdoor air compartment. The two casings are joined together in assembly adjacent to the interior vertical wall 25 that separates the front compartments from the rear compartments. The rear edge of the front casing is folded as illustrated in FIG. 4 into an S-shaped lip 65 that is adapted to receive the front edge section 66 of the rear casing. A slight interference fit is provided between the lip 65 and the front edge 66 of the rear casing so that a relatively tight joint is established between the casings when they are brought together in assembly. Threaded fasteners such as screws 68—68 may be threaded into the housing along the joint as shown to further secure the joint in assembly. The housing is arranged so that the two casings can be detached by simply pulling the front casing through the door of the equipment closet exposing the two front compartments. The vertical interior wall of the housing is then removed providing complete access to the heat pump equipment.

While this invention has been explained with reference to the structure disclosed herein, it is not confined to the details set forth and this invention is intended to cover any modifications and changes as may come within the scope of the following claims:

What is claimed is:

1. A heat pump for use in a building having limited space that includes:

a housing having horizontally disposed top and bottom walls and vertically disposed side walls, said housing being arranged for mounting in a small enclosure that does not have access to the exterior walls of the building, said housing having a vertical interior wall for forming an outdoor air compartment extending between the top and bottom walls of said housing and a horizontal wall abutting the vertical interior wall for forming both a lower indoor air compartment and an upper compressor compartment adjacent to the outdoor air compartment, said outdoor air compartment containing top and bottom openings and an outdoor air coil mounted between the openings whereby outdoor air flows vertically through the air compartment, said indoor air compartment containing a bottom opening and a side opening, an indoor air coil and a first blower means for moving indoor air through said compartment, said compressor compartment containing a refrigerant compressor and a four-way valve means for reversing the flow of refrigerant from the compressor through the coils, and a second blower means located outside said housing that is connected to one of the openings in said outdoor air compartment for moving outdoor air through said compartment.

2. The heat pump of claim 1 wherein said interior vertical wall of the housing has an upper vertical section, a lower vertical section that is offset from the upper vertical section and an angularly disposed intermediate section that divides the outdoor air cabinet into a horizontally expanded upper part and a narrower lower part, said outdoor coil being angularly disposed within the upper and lower regions of the outdoor compartment adjacent to the intermediate wall section.

3. The heat pump of claim 1 wherein the indoor coil is vertically aligned adjacent to the side opening in the indoor air compartment and said first blower means is connected to the bottom opening in said compartment.

4. The heat pump of claim 1 wherein the compressor compartment further contains a four-way reversing valve for selectively connecting the compressor to the indoor and outdoor coils for either heating or cooling indoor air passing through the indoor air compartment.

5. The heat pump of claim 1 wherein the housing is divided into separate casings that includes a first rear casing containing the outdoor air compartment and a front casing containing the indoor air compartment and the compressor compartment.

6. The heat pump of claim 5 wherein the casings are joined in assembly by removable fasteners.

7. The heat pump of claim 1 wherein said compartments extend across the width of said housing between opposed side walls of the housing.

8. A heat pump for use in a small building in a confined enclosure not having access to the exterior walls of the building that includes:

a rectangular housing that is divided into three separate compartment including an outdoor air compartment vertically disposed at the rear of the housing between the housing's top and bottom walls, an indoor air compartment and a compressor compartment mounted in the front of the housing one above the other, an interior wall separates the rear compartment from the two front compartments and includes a vertical upper wall section joined by an angularly disposed intermediate wall section whereby the upper part of the rear outdoor air compartment is expanded, an outdoor coil mounted at an angle in the rear outdoor air compartment adjacent to the intermediate wall so that the outdoor coil extends into the upper and lower parts of the rear outdoor air compartment, and an outdoor air blower means mounted exterior said housing and being arranged to move outdoor air through openings in the top and bottom walls of the housing along a vertical flow path.

9. The heat pump of claim 8 wherein said housing includes a front casing containing the indoor air compartment and the compressor compartment and a separate rear casing containing the outdoor air compartment.

10. The heat pump of claim 9 wherein said casings are joined in assembly by removable fasteners.

11. The heat pump of claim 8 wherein said indoor air compartment contains a front wall opening and a bottom wall opening, an indoor air blower to move indoor air between the openings and a vertically disposed indoor coil mounted adjacent to the front wall opening.

12. The heat pump of claim 8 wherein the compartments extend across the width of the housing.

13. A heat pump for use in a building having limited space that includes a housing having spaced apart horizontally disposed top and bottom walls and vertically disposed side walls being arranged for mounting for in a small enclosure that does not have access to an exterior wall of the building, said housing having a vertically disposed interior wall for forming an outdoor air compartment extending between the top and bottom walls of the housing and an indoor air compartment, said outdoor air compartment having a first vertical flow path that extends between the top and bottom walls of the housing for passing outdoor air through said outdoor air compartment and an outdoor air coil in said flow path, a first blower located outside said housing for moving outdoor air through said first air path, and said indoor air compartment having a second air path for circulating indoor air through said indoor air compartment, an indoor coil and a second blower mounted in said second air path, for circulating outdoor air through said indoor compartment.

14. The heat pump of claim 13 that further includes a flue connected to the outdoor air compartment and passing out of said building.

15. The heat pump of claim 14 wherein said first blower is mounted in said flue.

* * * * *